Jan. 15, 1957  D. C. McOMBER  2,777,212
APPARATUS FOR DRYING GRAIN AS THRASHED
Filed Nov. 26, 1954  3 Sheets-Sheet 1
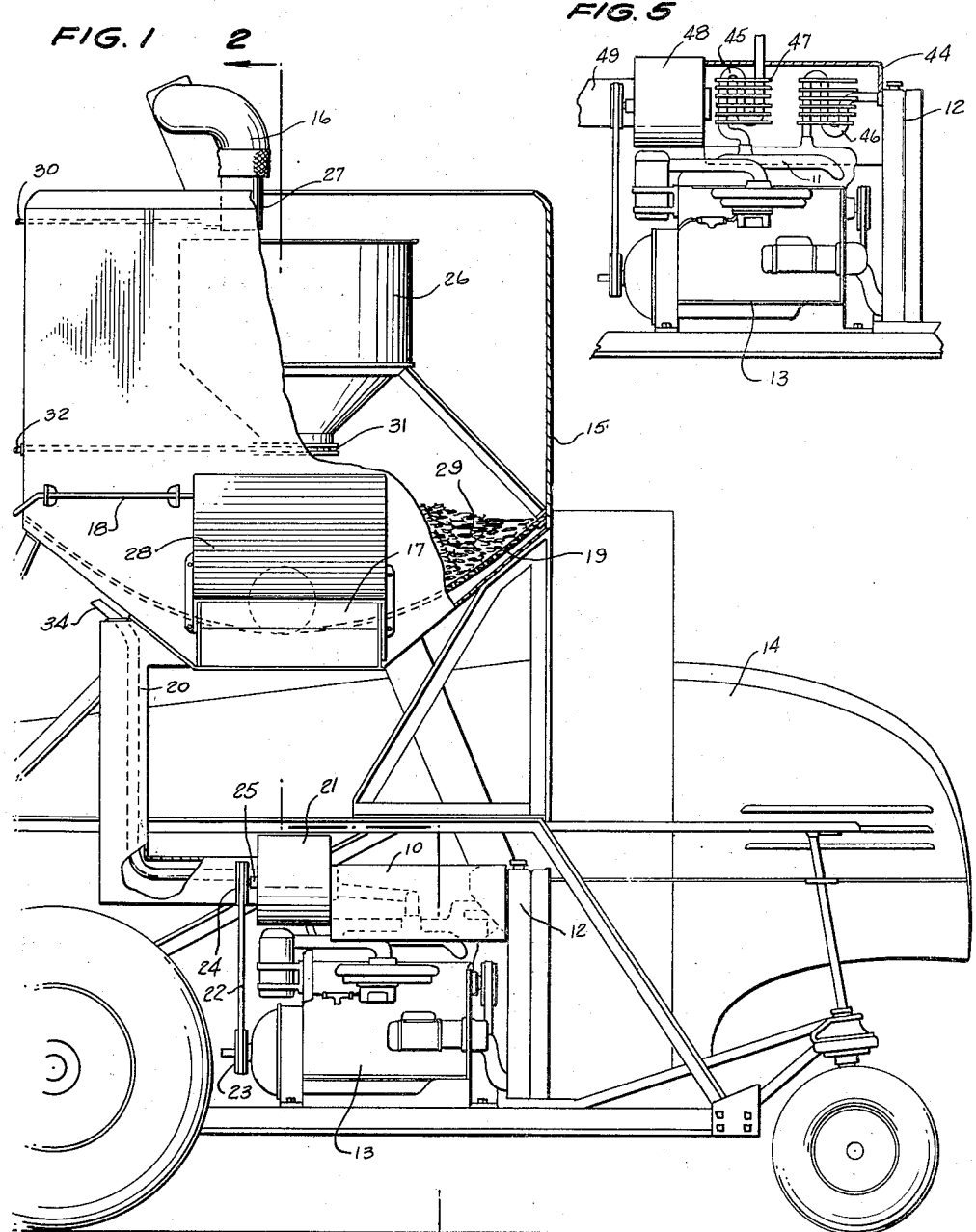
INVENTOR.
DEAN C. McOMBER
BY
McMorrow, Berman + Davidson
ATTORNEYS

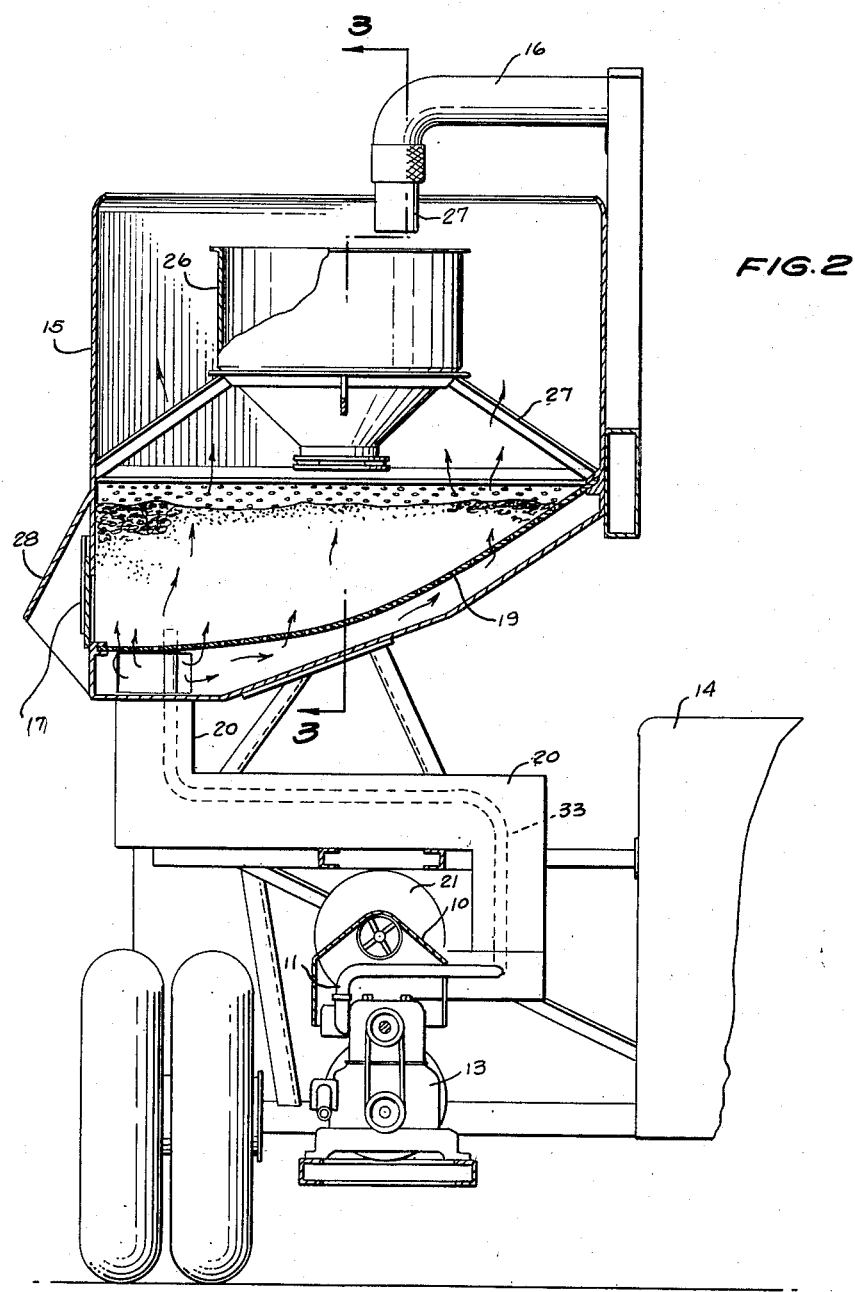

Jan. 15, 1957   D. C. McOMBER   2,777,212
APPARATUS FOR DRYING GRAIN AS THRASHED
Filed Nov. 26, 1954   3 Sheets-Sheet 3
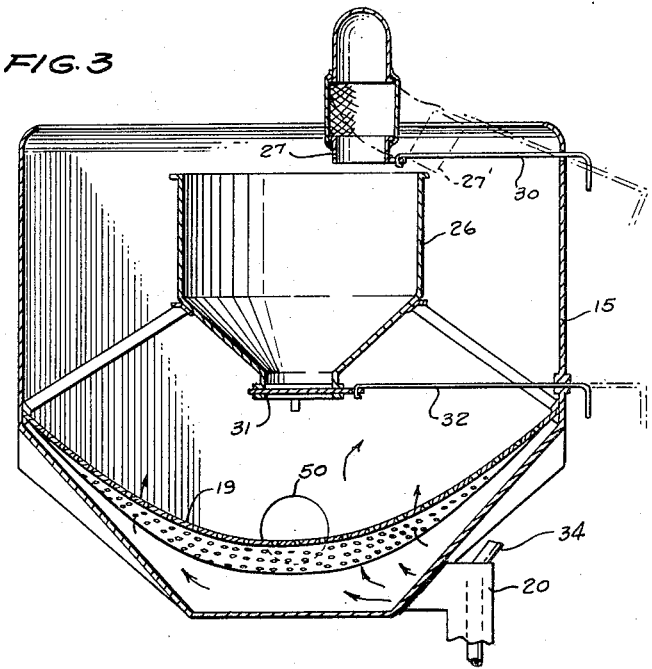
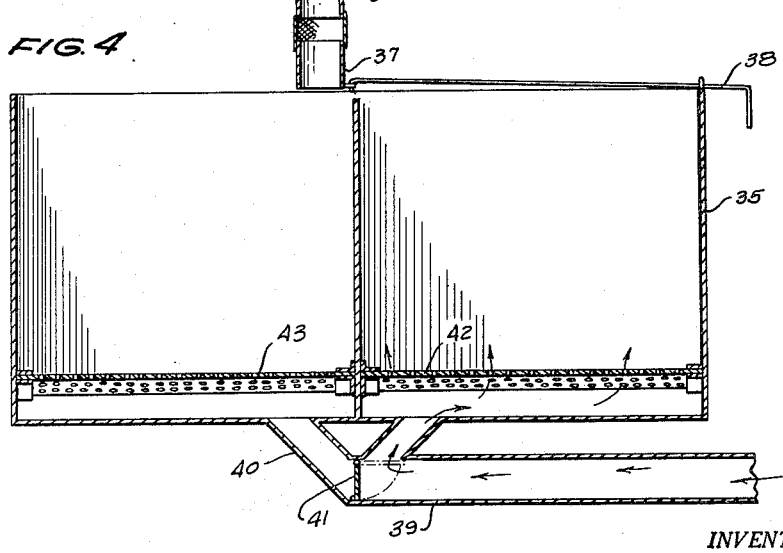
INVENTOR.
DEAN C. McOMBER
BY
McMorrow, Berman & Davidson
ATTORNEYS

United States Patent Office 2,777,212
Patented Jan. 15, 1957

2,777,212
APPARATUS FOR DRYING GRAIN AS THRASHED

Dean C. McOmber, Scott, Ohio

Application November 26, 1954, Serial No. 471,211

2 Claims. (Cl. 34—86)

The present invention relates to thrashing combines and to an apparatus to be attached to the combine for drying the grain as it is thrashed.

The primary object of the present invention is to provide means for utilizing the heat of the internal combustion engine to dry the grain as it is received in the gathering bin carried on the thrashing machine and from which it is discharged into grain wagons for transportation to places of storage.

Another object of the present invention is to provide a partition in the lower end and spaced from the bottom of the grain gathering bin on a harvesting machine and providing means for conducting air heated by the exhaust of the internal combustion engine of the machine to the space underneath the partition so that grain as it is received upon the partition as thrashed will be subjected to the heated air.

A further object of the present invention is to provide such a partition in the lower end and spaced from the bottom of the grain-gathering bin of the thrashing machine, and to provide means for covering the partition with untreated grain immediately after the discharge of grain that has been subjected to the heated air passing through the partition.

A still further object of the present invention is to provide an economically made and installed dryer for the grain as it is thrashed and one which utilizes to best advantage all of the heat, otherwise wasted, generated by the internal combustion engine of the thrashing machine.

A still further object of the present invention is to provide a grain dryer which can be attached to old or new thrashers and can be used for drying all small grains or seeds in order to more safely store the crop which sometimes contains high-moisture foreign material such as weeds and prevents adequate storage unless treated to a separate drying operation.

These and other objects and advantages of the present invention will be fully apparent from the following description when taken in connection with the annexed drawings, in which:

Figure 1 is a side view in elevation of a portion of a grain thrashing combine showing the gathering bin, and showing partly in cross section the apparatus of the present invention, Figure 2 is a front view partially in cross section on line 2—2 of Figure 1, Figure 3 is a partial view in cross section on line 3—3 of Figure 2, Figure 4 is a view in cross section of a second embodiment of the gathering bin of the present invention, and Figure 5 is an alternative form of a heat exchanger unit for use with the present invention.

Referring in greater detail to the drawings in which like numerals indicate like parts throughout the several views, in Figures 1 to 3 is seen the housing 10 surmounting and superimposed above the exhaust manifold 11 and connected at one end to the radiator 12 of the combine's internal combustion engine indicated by the reference numeral 13.

The combine, indicated by the reference numeral 14, is ordinarily equipped with a grain gathering bin 15 into which grain is delivered by the grain delivery tube 16 as it is thrashed. The bin 15 is normally upstanding with an open top and is provided with a discharge gate 17 operatively controlled by the handle 18.

A perforated partition 19 is disposed within the bin 15 and extends from one side to the other side in spaced relation to the bottom of the bin 15 to form a chamber by means of which hot air may be distributed across the full bottom of the bin 15. A conduit 20 connects the chamber thus formed in the lower end of the bin 15 to the blower 21 at the outlet end thereof, the blower 21 being connected at its inlet to the housing 10. A drive belt 22 operatively connects the pulley 23 on the engine 13 to the pulley 24 on the shaft 25 of the blower 21.

A reserve bin 26 is carried by the struts 27 within the bin 15 in superimposed relation with the struts of the partition 19. The discharge end 27 of the delivery tube 16 is movable from a position in which it delivers grain to the reserve bin 26 to a position in which it delivers grain to the gathering bin 15.

A hood 28 overhangs the discharge gate 17 to prevent spilling of the grain, indicated by the reference numeral 29 as it is discharged from the bin 15. A rod 30 is attached to the discharge end 27 of the grain delivery tube 16 for moving it from its position delivering grain to the reserve bin 26 to the position delivering grain to bin 15 (as shown in dotted lines at 27' in Figure 3). A gate 31 on the lower end of the reserve bin 26 is controlled by a rod 32 projecting from the wall of the bin 15.

This permits the discharging of grain held within the reserve bin 26 onto the top surface of the partition 19 immediately after a quantity of grain 29 which has been treated by the heated air is removed through the discharge gate 17.

In order to obtain the optimum amount of heat from the internal combustion engine 13, the exhaust pipe, indicated at dotted lines in Figures 1 and 2 at 33, is bent and positioned within the conduit 20 but is exhausted to the atmosphere at 34 as seen in Figures 1 and 3.

In Figure 4, is shown a double tank 35 having two sections which may be alternately filled by the grain delivery tube 36 having the flexible and movable discharge end 37 controlled by the rod 38 permits position over one tank to its position over another tank. The conduit 39 for hot air is provided with a V-formation 40 and a gate 41 for alternatingly discharging the hot air into one or the other of the tanks and upwardly through either of the partitions 42 or 43. This embodiment contemplates a newly constructed combine, whereas the embodiment illustrated in Figures 1 to 3 is an adaptation of a grain gathering tank as presently in use on a combine.

In Figure 5, a heat exchanger unit is contained within the housing 44 and consists of a bent conduit 45 connected to the exhaust manifold 11 and a bent tube 46 connected to the hot water jacket and to the radiator 12, together with the fins 47 which assist in heating the air drawn through the upper part of the radiator and into the blower 48 for discharge into a conduit 49 which may be connected to either one of the bins of the first and second embodiments of the present invention.

In operation, as the combine is driven across the field of grain, grain is harvested and thrashed by the combine and delivered to the grain delivery tube 16, or 36, the grain is permitted to entirely cover the partition 19 or 42, 43 and the air from the blower 21 is passed upwardly through the grain to dry it.

The blower provides a steady blast of heated air, and for this reason it is best to entirely cover the perforated partition of either of the embodiments shown in Figures 1 to 3, and 4, and therefore the grain is held in the first embodiment within the reserve tank 26 when the treated and dried grain is discharged from the opening 50 and through the discharge gate 17. In the second embodiment the grain is allowed to partially fill or fill one of the tanks and the heated air is directly into space underneath the associated partition until the grain therein is dry and then the discharge end 37 of grain delivery tube 36 is swung to the other tank and the process is repeated.

This effects a saving of grain otherwise lost if the grain were delivered directly from either one of the grain delivery tubes directly over the partition through which was flowing the blast of heated air. Suitable controls (not shown) may be connected to the shaft 25 of the blower 21 to disconnect it from the pulley 24.

While only preferred embodiments of the present invention have been here illustrated and described, it is believed that other embodiments may be made and practiced within the scope of the appended claims without departing from the spirit of the invention.

What is claimed is:

1. In a grain harvesting machine, an upstanding bin including a bottom and open at its top, an overhead delivery tube for conveying freshly harvested grain to said bin, a perforated partition disposed within and extending across said bin and spaced above said bottom for supporting grain thereon, the space between said partition and bin bottom forming a chamber, a housing adapted to surround and be superposed upon the engine exhaust manifold and the radiator of said harvesting machine, a blower positioned at the inlet end of said housing and connected to said housing inlet end, a conduit connecting the outlet end of said blower to the lower end of said chamber, a reserve bin carried by said first named bin in superimposed relation with respect to said partition, means for shifting said delivery tube to a position for delivering grain to said first named bin to a position for delivering grain to said reserve bin, and means operatively connected to said reserve bin for discharging grain held therein under the top surface of said partition after dried grain thereon has been removed.

2. In a grain harvesting machine, an upstanding bin including a bottom and open at its top, an overhead delivery tube for conveying freshly harvested grain to said bin, a perforated partition disposed within and extending across said bin and spaced above said bottom for supporting grain thereon, the space between said partition and bin bottom forming a chamber, a housing adapted to surround and be superimposed upon the engine exhaust manifold and the radiator of said harvesting machine, a blower positioned at the inlet end of said housing and connected to said housing inlet end, a conduit connecting the outlet end of said blower to the lower end of said chamber, a heat exchange element positioned within said conduit and having one end adapted to be connected to the exhaust of the engine of said harvesting machine and having the other end exteriorly of said conduit and adjacent said chamber, a reserve bin carried by said first named bin in superimposed relation with respect to said partition, means for shifting said delivery tube to a position for delivering grain to said first named bin to a position for delivering grain to said reserve bin, and means operatively connected to said reserve bin for discharging grain held therein onto the top surface of said partition after dried grain thereon has been removed.

References Cited in the file of this patent

UNITED STATES PATENTS

| | | |
|---|---|---|
| 988,671 | Staunton | Apr. 4, 1911 |
| 1,662,431 | MacGregor | Mar. 13, 1928 |
| 2,227,634 | Dalin | Jan. 7, 1941 |